US009831501B2

(12) United States Patent
Kang et al.

(10) Patent No.: US 9,831,501 B2
(45) Date of Patent: Nov. 28, 2017

(54) POROUS GRAPHENE FOR CATHODE OF SECONDARY BATTERY AND ITS MANUFACTURING METHOD

(71) Applicant: SNU R&DB FOUNDATION, Seoul (KR)

(72) Inventors: Ki-Suk Kang, Seoul (KR); Hae-Gyeom Kim, Seoul (KR)

(73) Assignee: Seoul National University R&DB Foundation, Seoul (KR)

(*) Notice: Subject to any disclaimer, the term of this patent is extended or adjusted under 35 U.S.C. 154(b) by 148 days.

(21) Appl. No.: 14/778,390

(22) PCT Filed: Mar. 12, 2014

(86) PCT No.: PCT/KR2014/002052
§ 371 (c)(1),
(2) Date: Sep. 18, 2015

(87) PCT Pub. No.: WO2014/148763
PCT Pub. Date: Sep. 25, 2014

(65) Prior Publication Data
US 2016/0285095 A1    Sep. 29, 2016

(30) Foreign Application Priority Data

Mar. 19, 2013  (KR) .................. 10-2013-0029186
Mar. 10, 2014  (KR) .................. 10-2014-0027570

(51) Int. Cl.
*H01M 4/58* (2010.01)
*H01M 4/587* (2010.01)
(Continued)

(52) U.S. Cl.
CPC .......... *H01M 4/587* (2013.01); *C01B 32/184* (2017.08); *H01M 4/133* (2013.01);
(Continued)

(58) Field of Classification Search
None
See application file for complete search history.

(56) References Cited

U.S. PATENT DOCUMENTS 9,315,388 B2 *  4/2016  Burton ............... C01B 31/0469
2011/0014111 A1  1/2011  Leugers et al.
(Continued)

FOREIGN PATENT DOCUMENTS

KR  10-2012-0012226   2/2012
KR  10-2012-0109550   10/2012
(Continued)

OTHER PUBLICATIONS

Xiao et al., "Hierarchically Porous Graphene as a Lithium—Air Battery Electrode," NANO Letters 2011, pp. 5071-5078.

*Primary Examiner* — Scott J Chmielecki
(74) *Attorney, Agent, or Firm* — Hahn Loeser & Parks LLP

(57) ABSTRACT

In the graphene manufacturing method, a graphite oxide is formed from graphite, and then the graphite oxide is treated with a hydrochloric acid. The hydrochloric acid-treated graphite oxide is reduced at temperature of 120° C. or above and 200° C. or below by performing thermal treatment thereto. Since a low-temperature process is used for manufacturing graphene by performing thermal treatment at a relatively low temperature for a short time, this method has great economic feasibility and utilization. Due to a simple composing process and low thermal treatment temperature, graphene may be mass-produced with a low price. In particular, the graphene may be used as a cathode material for a lithium secondary battery, which exhibits a high capacity at a high voltage of 2V or above by reacting with Li, different from an anode material of a lithium secondary battery.

11 Claims, 13 Drawing Sheets

(51) Int. Cl.
  *H01M 10/054* (2010.01)
  *H01M 4/133* (2010.01)
  *H01M 10/052* (2010.01)
  *C01B 32/184* (2017.01)
  *B82Y 40/00* (2011.01)
  *B82Y 30/00* (2011.01)

(52) U.S. Cl.
  CPC ....... *H01M 10/052* (2013.01); *H01M 10/054* (2013.01); *B82Y 30/00* (2013.01); *B82Y 40/00* (2013.01); *C01B 2204/04* (2013.01); *Y10S 977/734* (2013.01); *Y10S 977/842* (2013.01); *Y10S 977/932* (2013.01)

(56) References Cited

U.S. PATENT DOCUMENTS

| | | | |
|---|---|---|---|
| 2013/0089790 A1* | 4/2013 | Byon | H01G 11/36 429/231.8 |
| 2013/0224603 A1* | 8/2013 | Chen | B82Y 30/00 429/322 |
| 2013/0319973 A1* | 12/2013 | Tour | C01B 31/0438 216/54 |
| 2014/0231718 A1* | 8/2014 | Lin | H01B 1/04 252/503 |
| 2014/0272199 A1* | 9/2014 | Lin | H01L 51/444 427/600 |
| 2015/0218003 A1* | 8/2015 | Zhamu | C01B 31/0476 428/220 |
| 2015/0239741 A1* | 8/2015 | Burton | C08G 65/321 525/327.3 |
| 2016/0016804 A1* | 1/2016 | Li | B82Y 40/00 252/511 |

FOREIGN PATENT DOCUMENTS

| | | |
|---|---|---|
| KR | 10-2012-0119393 | 10/2012 |
| KR | 10-2013-0015719 | 2/2013 |

\* cited by examiner

Go with HCl treatment annealing ~120℃

Functionalized graphene (a)

(b)

POROUS GRAPHENE FOR CATHODE OF SECONDARY BATTERY AND ITS MANUFACTURING METHOD

This application is a National Stage application of International Application No. PCT/KR2014/002052, filed Mar. 12, 2014, which claims benefit of Korean Patent Application No. 10-2014-0027570, filed Mar. 10, 2014, which claims benefit of Korean Patent Application No. 10-2013-0029186, filed Mar. 19, 2013, the entire contents of which are hereby incorporated by reference herein.

TECHNICAL FIELD

The present disclosure relates to a graphene, its manufacturing method, a device using the graphene and its manufacturing method, and more particularly, to a porous graphene for a cathode of a secondary battery, its manufacturing method, a secondary battery using the porous graphene as a cathode and its manufacturing method.

BACKGROUND ART

Graphene represents a planar two-dimensional carbon structure having a sp2 bond, and the graphene has excellent characteristics such as high mechanical features (Young's modulus: 41.8 GPa, tensile strength: 293.3 MPa), high electric conductivity (351 S cm$^{-1}$), and broad specific surface area (~2600 m$^2$g$^{-1}$) and is very stable physically and chemically. Such specific structure and properties of graphene have been studied to be used for various fields such as electronics, sensors, mechanical resonators, energy storage and conversion (super capacitors, batteries, fuel cells, solar cells or the like) and displays.

The graphene is manufactured in various ways, for example by means of mechanical processing, epitaxy, thermal expansion, vapor phase, chemical vapor deposition (CVD), graphene oxidation-reduction, graphite intercalation compound or the like. In order to apply graphene with excellent characteristics to various fields, the graphene should be mass-produced at low temperature. In addition, in order to commercially use graphene products, price competitiveness and stable processes should be ensured.

At the present, an oxidation-reduction method is generally used for manufacturing a single-layered or multi-layered graphene. In the oxidation-reduction method, graphite oxidized to produce a graphite oxide. After that, the prepared graphite oxide is dispersed in a solvent, a graphene layer is separated by means of ultrasonic dispersion or the like to make a thin graphene oxide, and then the graphene oxide is reduced to make graphene. In order to reduce a graphene oxide, high-temperature thermal treatment is performed at 800° C. or above under a hydrogen or argon atmosphere, or a reducing agent such as hydrazine hydrate, sodium borohydrate (NaBH$_4$), sulfuric acid (H$_2$SO$_4$) or the like is used, as well known in the art.

However, such an existing graphene manufacturing method has problems in its economic feasibility and utilization due to high thermal treatment temperature, the use of a reducing agent, low yield caused by bad efficiency, and high production cost. In addition, since impurities are included in the graphene, low purity becomes another problem.

Meanwhile, it has been studied to use graphene with excellent properties as a material for an electrode of a lithium secondary battery. However, the existing graphene study has been limited to an anode material of a secondary battery, and the study has also been focused on a hybrid structure with other nanoparticles. LiCoO$_2$ used as a cathode material of a secondary battery at the present is expensive and may cause safety problems since it is structurally unstable and may generate oxygen. Therefore, there is a demand for developing its alternate material.

DISCLOSURE

Technical Problem

The present disclosure is designed to solve the problems of the related art, and therefore the present disclosure is directed to providing a method for manufacturing a high-purity graphene at a high yield.

The present disclosure is also directed to providing a porous graphene particularly suitable for a cathode of a secondary battery.

Technical Solution

In one aspect of the present disclosure, in the graphene manufacturing method, a graphite oxide is formed from graphite, and then the graphite oxide is treated with a hydrochloric acid. The hydrochloric acid-treated graphite oxide is reduced at temperature of 120° C. or above and 200° C. or below by performing thermal treatment thereto.

The present disclosure also provides a porous graphene for a cathode of a secondary battery, which is manufactured by the above manufacturing method. The porous graphene exhibits a high voltage of 2V or above in comparison to lithium and thus may serve as a cathode.

Advantageous Effects

In the graphene manufacturing method according to the present disclosure, a graphite oxide is treated with a hydrochloric acid and then reduced at a low thermal treatment temperature. Since a chemical reduction reaction is not required, the thermal treatment temperature may be greatly lowered. Since graphene is manufactured by performing thermal treatment at a low temperature of 200° C., in comparison to an existing process where thermal treatment is performed at high temperature of 900° C., this method has great economic feasibility and utilization. Due to a simple composing process and low thermal treatment temperature, in the present disclosure, graphene may be mass-produced with a low price.

In the graphene manufacturing method of the present disclosure, molecules present in the graphite oxide move out of the graphene during the thermal treatment process to form a porous structure. In addition, a functional group at the surface of the graphene may be controlled in a simple way of adjusting the amount of an oxidizer put while making a graphite oxide or the thermal treatment temperature.

Accordingly, the graphene of the present disclosure may be applied to various fields since it may serves as a porous conductor and its functional group may be controlled. In addition, since a functional group at the surface of the graphene with a very large surface area may electrochemically react with lithium, the graphene may be applied to a secondary battery. Moreover, due to broad surface area, the porous structure and the high electric conductivity, the graphene of the present disclosure may be applied as an electrode material in various fields, for example a super capacitor.

In particular the graphene of the present disclosure may be used as a cathode material for a lithium secondary battery, which exhibits a high capacity at a high voltage of 2V or above by reacting with Li, different from an anode material of a lithium secondary battery which exhibits a low voltage of 2V or below (vs. Li metal). When being used for a cathode of a lithium secondary battery, the graphene of the present disclosure may give a high capacity of 250 mAh/g and a high power of 20 kW/kg at a common charging/discharging rate. In addition, the graphene of the present disclosure may maintain high capacity at a very fast charging/discharging rate.

According to the present disclosure, since the functional group of the graphene acts as a site for storing ions such as sodium as well as lithium, the graphene of the present disclosure may also be used as a cathode material of a secondary battery which uses a metal other than lithium.

DESCRIPTION OF DRAWINGS

FIG. 7a shows XPS data, FIGS. 7b and 7c show cyclic voltammetry (CV) data, and FIG. 7d shows a correlation between an O/C ratio and gravimetric capacitance.

FIG. 8a shows a charging/discharging curve of a lithium secondary battery, FIGS. 8b and 8c show ex-situ XPS results, FIG. 8d shows a cycle experiment, and FIG. 8e shows a Ragone plot.

BEST MODE

In particular, in the present disclosure, an oxidizer may be used for oxidizing graphite during the step of forming a graphite oxide, and the degree of functionalization of the graphene may be controlled by adjusting the amount of the oxidizer.

The thermal treatment may be performed under an air or inert gas atmosphere, and thermal treatment may be added to further performing additional thermal treatment at 200° C. or above under an inert gas atmosphere.

MODE FOR DISCLOSURE

Hereinafter, preferred embodiments of the present disclosure will be described in detail with reference to the accompanying drawings. However, the embodiments of the present disclosure may be modified in various ways, and the scope of the present disclosure should not be limited to the following embodiments. The embodiments of the present disclosure are provided for perfect explanation of the present disclosure to those skilled in the art.

Figure 1:
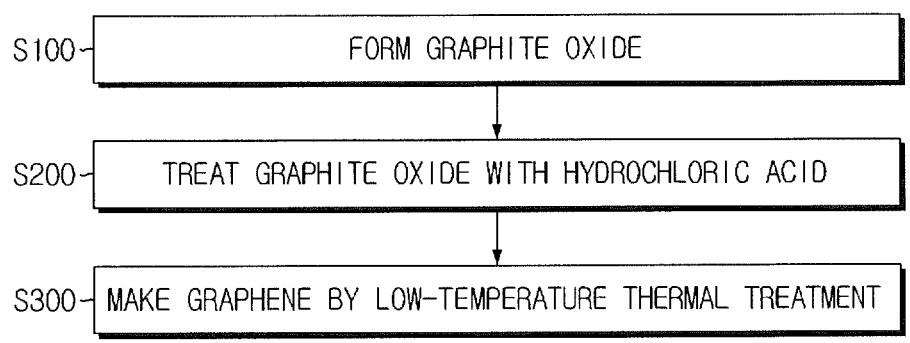
FIG. 1 is a flowchart for illustrating a graphene manufacturing method according to an embodiment of the present disclosure.

First, FIG. 1 is a flowchart for illustrating a graphene manufacturing method according to an embodiment of the present disclosure.

Referring to FIG. 1, in Step S100, a graphite oxide is formed from graphite.

In order to form a graphite oxide, inter-layer coupling of graphite is broken by using $NaNO_3$, $H_2SO_4$ and $KMnO_4$, and a functional group such as —OH or —COOH is adhered thereto. This process will be described below in more detail.

In order to form a graphite oxide from graphite, graphite may be preprocessed with a strong acid such as $H_2SO_4$ and then oxidized using an oxidizer such as $KMnO_4$. If $NaNO_3$ is further added together with $H_2SO_4$, $HNO_3$ is generated. $HNO_3$ serves as an oxidizer which is helpful for oxidizing graphite and also oxidizing impurities contained in the graphite. Deionized water is put into a mixture obtained by adding with $NaNO_3$, $H_2SO_4$ and $KMnO_4$ to graphite to make a solution. After that, if $H_2O_2$ is added thereto, a graphite oxide is formed.

In particular, in the present disclosure, the amount of a functional group at the surface of a final graphene is controlled in a simple way by adjusting the amount of an oxidizer ($KMnO_4$) put while making a graphite oxide or adjusting a thermal treatment temperature. The graphene prepared through the above controlling has various electric characteristics and thus may be applied to various fields such as secondary batteries. If the amount of the functional group increases, the oxidation degree increases, which results in enhanced gravimetric capacitance and energy density. On the contrary, if the amount of the functional group decreases, power performance is improved. Therefore, it is possible to manufacture a secondary battery with optimized performance by adjusting the amount of the functional group according to demanded requirements of each secondary battery in consideration of capacity, energy density, and power performance.

Next, the graphite oxide is treated with a hydrochloric acid (Step S200). This step may be performed by adding a hydrochloric acid to floating matters, which remains after filtering the solution, and then filtering the floating matters. The hydrochloric acid treatment of Step S200 is entirely different from Hummers treatment well known in the art as a method for obtaining a graphite oxide from graphite by using a hydrochloric acid. In the Hummers treatment, a low-concentration hydrochloric acid (about 10%) is used as a cleaning material for removing impurities such as metallic pollution source of the graphite oxide, and deionized water cleaning is further performed to eliminate remaining hydrochloric acid. However, in the present disclosure, a highconcentration hydrochloric acid (37%) is used, and the hydrochloric acid is not removed using deionized water so as to intentionally remain the hydrochloric acid in the graphite oxide. In other words, in the present disclosure, HCl is actively utilized, different from existing techniques.

Next, the hydrochloric acid-treated graphite oxide is reduced at low temperature of 200° C. or below by performing thermal treatment thereto (Step S300). The thermal treatment may be performed under an air or inert gas atmosphere. The inert gas may employ helium (He), nitrogen ($N_2$), argon (Ar), neon (Ne), xenon (Xe) or the like. In particular, in the present disclosure, the thermal treatment may be performed in the air, and particularly the thermal treatment may be performed at low temperature of 120° C. or above and 200° C. or below. In addition to the low-temperature thermal treatment, additional reduction thermal treatment may be further performed at 200° C. or above under an inert gas atmosphere in order to further adjust the functionalization of graphene.

Even though an existing technique must have a step of separating graphite oxide layers by ultrasonic dispersion or the like, the present disclosure need not perform a physical separation step using a mechanical ultrasonic means. At a temperature lower than 120° C., graphene is not made even though HCl treatment is performed, because this temperature is not sufficient for partially separating graphene. If the thermal treatment temperature is 120° C. or above, graphene may be obtained by partially reducing the graphite oxide and separating. It is obvious to those skilled in the art that the reduction reaction effectively occurs at high temperature, and thus in the present disclosure, an upper limit of the thermal treatment temperature is not important. However, when the thermal treatment temperature does not exceed 200° C., good economic feasibility may be expected by means of the low processing temperature.

Figure 2:
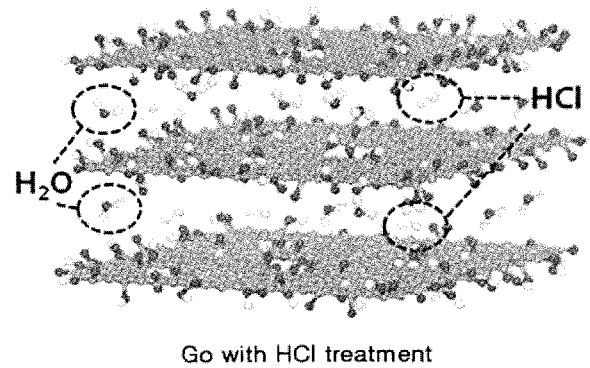
FIG. 2 is a diagram for illustrating pore formation and reduction mechanism when a graphene according to an embodiment of the present disclosure is manufactured.
Figure 2:
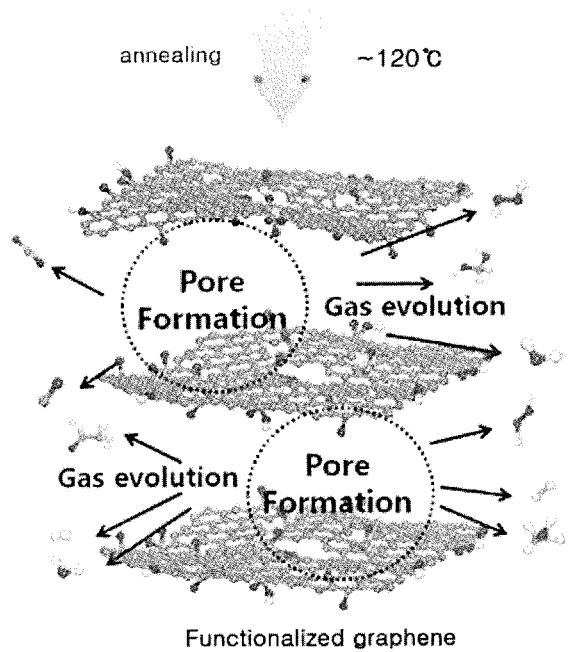

FIG. 2 is a diagram for illustrating pore formation and reduction mechanism when a graphene according to an embodiment of the present disclosure is manufactured.

As in Step S200 described above with reference to FIG. 1, if the hydrochloric acid treatment is performed, $H_2O$ and HCl are mixed and captured between hydrophilic graphite oxide layers. If low-temperature thermal treatment is performed thereto as in Step S300, gas moves out due to high vapor pressure of HCl, and the functional groups at the surface of the graphite oxide are removed together. At the same time, since the great vapor pressure of HCl is sufficient to separate the graphite oxide layers, graphene is made. The amount of the oxidizer may be determined in consideration of the functionalization degree, and some functional groups remain at the surface of the graphene through partial reduction to determine electric characteristics of the graphene. As the functional groups are rapidly removed by means of the hydrochloric acid, various gases are generated, and in this process, pores are formed. Accordingly, the graphene manufactured according to the present disclosure has a porous structure, and in order to have the porous structure, HCl is essentially used, which is a technical feature of the present disclosure.

As described above, in the present disclosure, graphene is manufactured by treating a graphite oxide with a hydrochloric acid and then reducing the graphite oxide at a low thermal treatment temperature of 200° C. or below. In an existing technique, in order to manufacture graphene from a graphite oxide, high-temperature thermal treatment of 800° C. or above should be performed, or a chemical material such as hydrazine should be used. However, in the present disclosure, graphene may be mass-produced just by low-temperature thermal treatment of 200° C. or below, and particularly functional groups of the graphene may be easily controlled during the manufacturing process, which makes it possible to manufacture graphene with optimal functions for various fields.

According to the present disclosure, graphene which has been not easily mass-produced and also has a high price may be composed in a simple way. The graphene composing method according to the present disclosure is simple, uses cheap materials and allows composition at low temperature. Thus, graphene may be mass-produced with low price, and thus the present disclosure is advantageous for commercial use of graphene.

When the hydrochloric acid present in the graphite oxide evaporates and moves out, pores are formed. Thus, the graphene according to the present disclosure may be manufactured to have a porous structure. As in the Experimental Example described later, the graphene manufactured according to an embodiment of the present disclosure has a great surface area and excellent electric conductivity due to the porous structure, and thus the graphene has excellent performance as a cathode material of a lithium secondary battery. In particular, the graphene according to the present disclosure may be used as a cathode material for a lithium secondary battery, which exhibits a high capacity at a high voltage of 2V or above by reacting with Li, different from an anode material of a lithium secondary battery which exhibits a low voltage of 2V or below, in comparison to lithium of an existing technique. Hereinafter, the embodiment of the present disclosure will be described in more detail based on the Experimental Example.

EXPERIMENTAL EXAMPLE

In the Experimental Example, $NaNO_3$ (1 g) and $H_2SO_4$ (45 mL) were put into 1 g of graphite and stirred at 0° C. for about 30 minutes. $KMnO_4$ serving as an oxidizer was added to the solution while changing its amount to 4 g, 5 g and 6 g for each sample, and was dissolved by stirring at 50° C. for about 2 hours. The amount of the oxidizer was changed differently in order to adjust the oxidation degree of graphene, namely the functionalization degree of the graphene surface. After that, 100 mL of deionized water was put thereto and $H_2O_2$ (6 mL, 35%) was added to the solution, and its color was changed into light brown while bubbles are generated. The solution was filtered, and 150 mL of 10% hydrochloric acid and 100 mL of 37% hydrochloric acid were put successively to floating materials remaining after filtering. The filtered resultant material was put into an oven of 120° C. for about 6 hours to compose graphene. In this process, the color of the graphite oxide was changed from light brown into black, and the graphite oxide was rapidly expanded. Graphene was not manufactured at temperature lower than 120° C. and without HCl.

According to the present disclosure, graphene is composed even at a low temperature of about 120° C. The hydrochloric acid present in the graphite oxide is gasified at low temperature and rapidly moves out, and in this process, it was found that functional groups were reduced and removed together, through experiments explained later. In particular, it was found that the functional groups at the graphene surface may be controlled by adjusting the amount of the oxidizer put while manufacturing the graphite oxide or the thermal treatment temperature.

Figure 3:
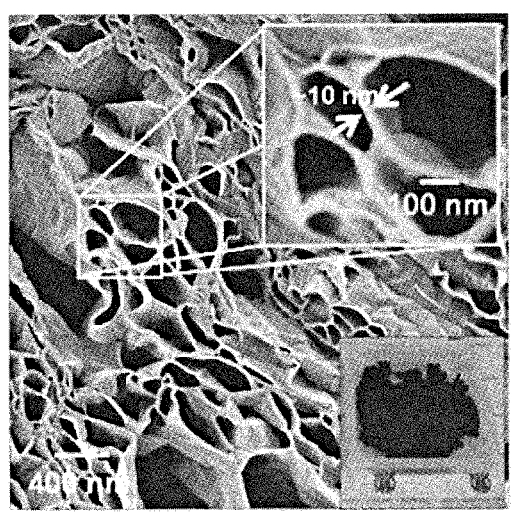
FIG. 3 is a field emission scanning electron microscope (FE-SEM) photograph showing a graphene manufactured according to the Experimental Example of the present disclosure.

First, FIG. 3 is a field emission scanning electron microscope (FE-SEM) photograph showing a graphene manufactured according to the Experimental Example of the present disclosure. Referring to FIG. 3, it may be found that the manufactured graphene is composed of graphene nanoplates with a thickness of 10 nm and has a uniform pore size of several ten to several hundred nm. As gas moves out, pores are formed to extend from the inside of the graphene to the surface of the graphene. This porous structure promotes efficient carriage of lithium ions to improve charging and discharging characteristics when the graphene is used as a cathode of a lithium secondary battery.

Figure 4:
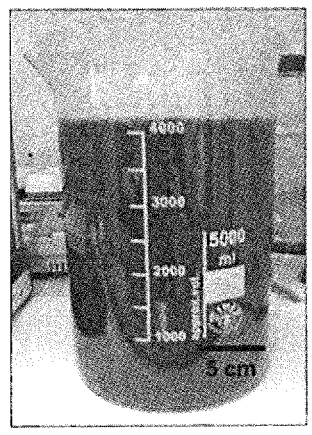
FIG. 4 is a photograph showing a yield of graphene manufactured according to the Experimental Example of the present disclosure.
Figure 4:

FIG. 4 is a photograph showing a yield of graphene manufactured according to the Experimental Example of the present disclosure. FIG. 4(a) shows graphite oxide slurry after hydrochloric acid treatment and before filtering. FIG. 4(b) shows graphene after low-temperature thermal treatment. When 30 g of graphite is used as a raw material, about 28.5 g of graphene may be obtained, which shows a very high yield of about 95%. When graphene is produced using an existing technique, about 1 g of graphene may be composed at one time. However, in the present disclosure, the amount of composed graphene may be greatly increased. When graphene was composed at a laboratory, about 30 g of graphene was composed at once. In a factory, the composing amount may be greatly increased. As described above, the graphene manufacturing method according to the present disclosure allows easy composing and ensures a high yield, which is advantageous for mass production.

The graphene was analyzed by means of X-ray photoelectron spectroscopy (XPS) and X-ray diffraction (XRD) to check that the graphite oxide was reduced by low-temperature thermal treatment. Reduction and separation occurring simultaneously during the low-temperature thermal treatment were analyzed by means of ex-situ and in-situ mass spectrometry (MS).

Figure 5:
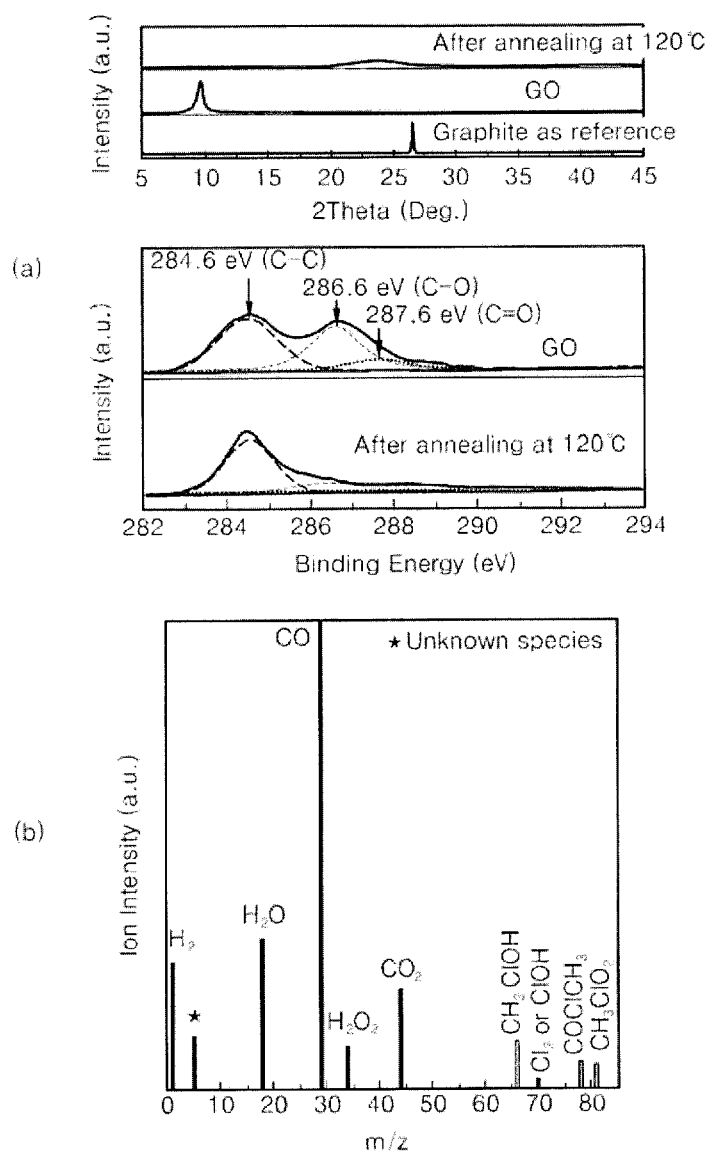
FIG. 5 is a diagram showing results of X-ray photoelectron spectroscopy (XPS), X-ray diffraction (XRD) and ex-situ mass spectrometry (ex-situ MS), when thermal treatment is performed to a graphite oxide according to the present disclosure.

FIG. 5 is a diagram showing results of X-ray photoelectron spectroscopy (XPS), X-ray diffraction (XRD) and mass spectrometry (MS), when thermal treatment is performed to a graphite oxide according to the present disclosure.

In FIG. 5(a), an upper diagram shows an XRD pattern of graphite, graphite oxide (GO) and after thermal treatment (annealing), and it may be found that a main GO peak is broadened while shifting from 10° to 24° due to the reduction of the graphite oxide. In FIG. 5(a), a lower diagram comparatively shows XRD of a sample before and after thermal treatment. Two peaks (286.6 eV, 287.6 eV) clearly shown in the C1s spectrum are caused by carbon bonds in C—O moities at a graphene side and in C=O moities at a graphene edge. The C—O and C=O bonds in the graphite oxide were rapidly decreased after thermal treatment. From the above results, it may be found that a significant amount of functional groups may be removed at 120° C. by using the hydrochloric acid.

FIG. 5(b) is a diagram showing ex-situ MS results. As shown in FIG. 5(b), CO, $H_2O$, $H_2$, $CO_2$ and $H_2O_2$ were generated due to the reaction between functional groups in the graphite oxide and carbon atoms. Gases having a molecular weight greater than 60 are generated by the reaction between HCl and functional groups. Generation of gas such as $CH_2ClOH$, $ClOOH$, $CCOClCH_3$ and $CH_3ClO_2$ means a reducing capability of HCl. Since the hydrochloric acid is introduced as mentioned above, it is found that Cl reacts with functional group of the graphite oxide to reduce the graphite oxide.

Figure 6:
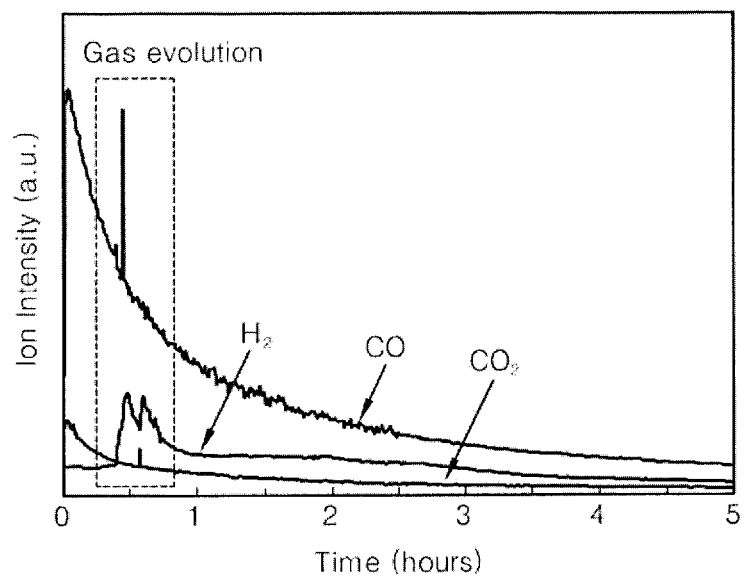
FIG. 6 is a diagram showing an in-situ MS result when thermal treatment is performed to a graphite oxide according to the present disclosure.

FIG. 6 is a diagram showing an in-situ MS result. Referring to FIG. 6, it may be found that gas is generated within a relatively short initial period, and from this, it may be understood why separation may be performed at a low temperature of about 120° C.

For comparison with the present disclosure, various cases where $CH_3COOH$, $H_2SO_4$, water and $NH_3$ were respectively treated instead of HCl were also experimented. When $CH_3COOH$ or $H_2SO_4$ was used, no pore was created. When $NH_3$ was used, the graphite oxide was not separated. Seeing the XPS analysis results, in the present disclosure with HCl treatment, the amount of functional groups remaining after the thermal treatment was far less in comparison to the case where water or $NH_3$ was used. From this, it may be understood that the HCl treatment employed in the present disclosure is more effective than water or $NH_3$ in reducing graphite oxide at a low temperature.

By changing the amount of the oxidizer, various samples with different amounts of functional groups (different functionalization degrees) were prepared. Each sample was marked with HFG (high-content functional group), MFG (medium-content functional group), LFG (low-content functional group), and MFG-400 (MFG sample, to which Ar reduction thermal treatment was additionally performed at 400° C.), depending on the target amount of functional groups. The amount of functional groups was based on the amount of C=O. When checking the results, 4 samples have the same porous structure.

Figure 7A:
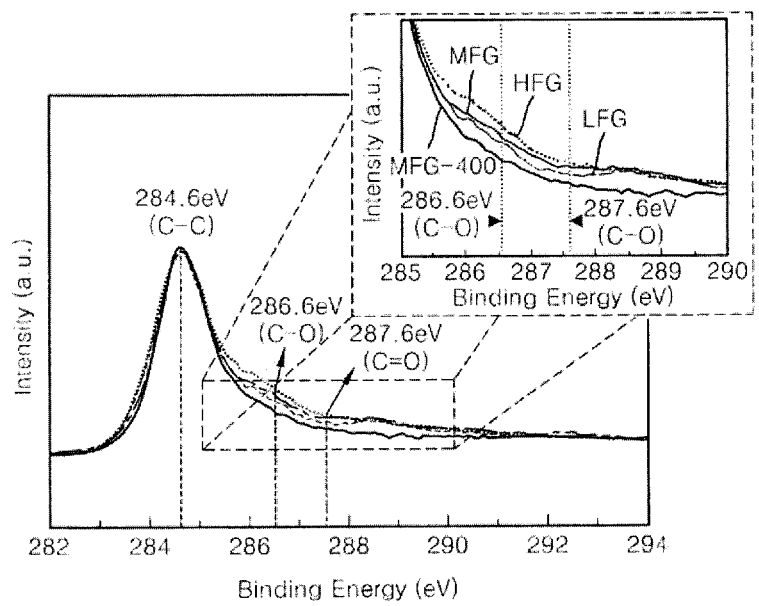
FIGS. 7a to 7d are diagrams showing electrochemical characteristics according to the degree of functionalization at the graphene manufactured according to the present disclosure, where
Figure 7B:
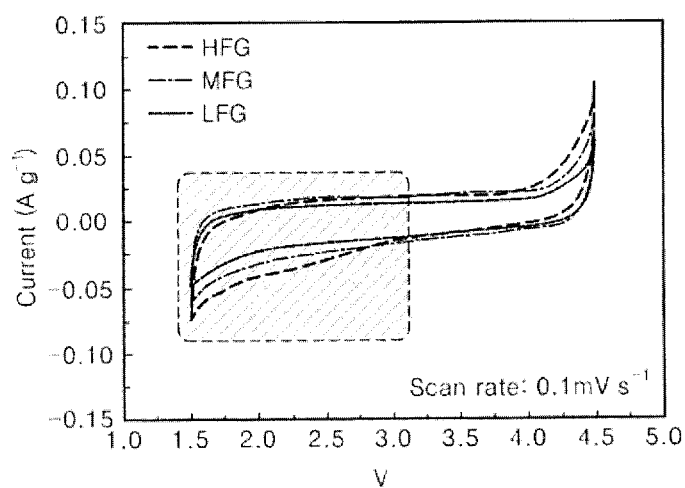
Figure 7C:
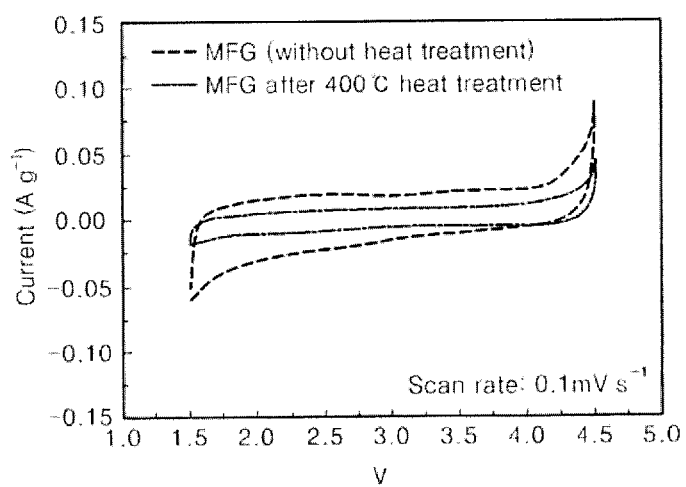
Figure 7D:
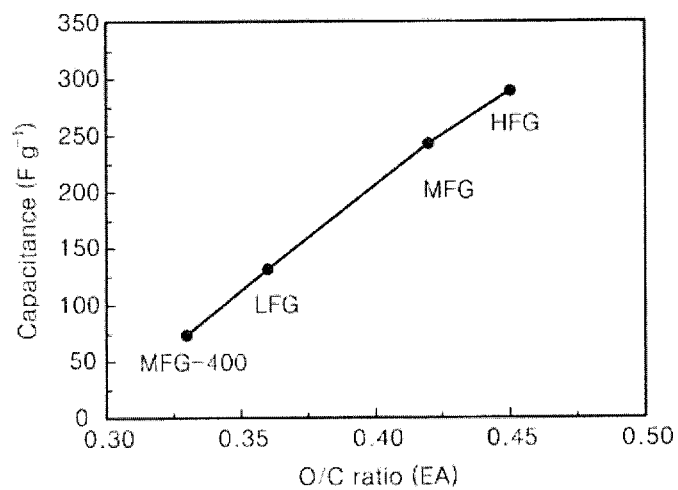

FIGS. 7a to 7d are diagrams showing electrochemical characteristics according to the degree of functionalization at the graphene manufactured according to the present disclosure, where FIG. 7a shows XPS data, FIGS. 7b and 7c show cyclic voltammetry (CV) data, and FIG. 7d shows a correlation between an O/C ratio and gravimetric capacitance.

As a result of the XPS analysis as shown in FIG. 7a, it has been proved that if the amount of an oxidizer is adjusted as proposed in the present disclosure, functional groups at the graphene surface may be controlled. In the C1s XPS spectrum, C—O and C=O peaks are in good agreement with the functionalized degree at the sample. HFG had greatest C—O and C=O peak intensities, and MFG-400 had smallest peak intensities.

Atom composition of each sample was analyzed using an element analyzer (EA). Its results are shown in Table 1 together with the results obtained by the XPS analysis.

TABLE 1

|  | O/C ratio (XPS) | O/C ratio (EA) |
| --- | --- | --- |
| GO | 1.26 | 1.12 |
| HFG | 0.47 | 0.45 |
| MFG | 0.34 | 0.42 |
| LFG | 0.30 | 0.36 |
| MFG-400 | 0.28 | 0.33 |

Figure 10:
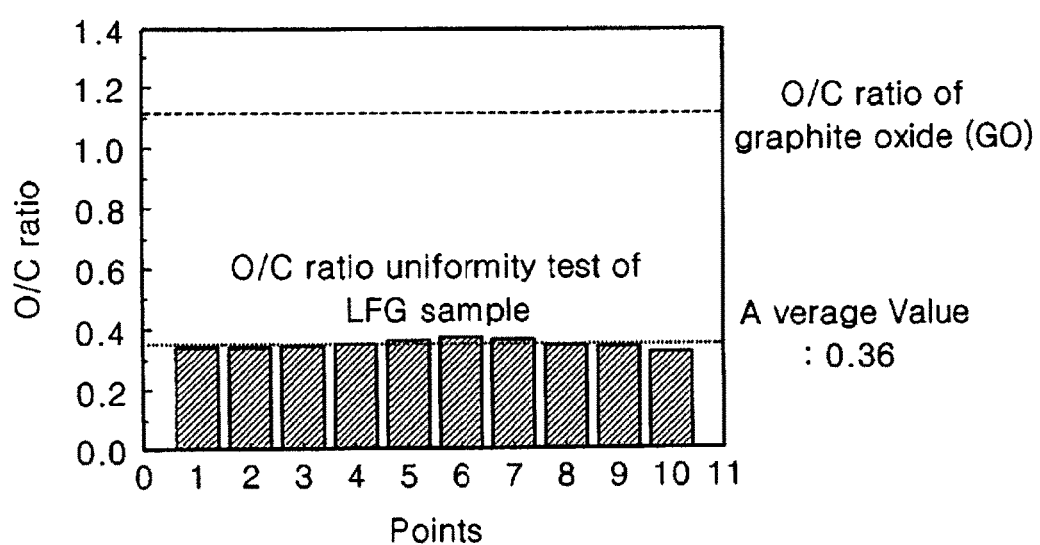
FIG. 10 is an illustration of randomly selected spots to check the uniformity of the O/C ratio in a sample.

An O/C ratio of the graphite oxide was 1.12, which was decreased to 0.47 at HFG and 0.28 at MFG-400. EA results and XPS results are not accurately matched because of different measurement conditions (for example, XPS was in a vacuum state, and EA was in the atmosphere), but the tendency of the O/C ratio decreasing from the graphite oxide to MFG-400 is identical. Since reduction is performed rapidly, ten spots were randomly selected and measured to check uniformity of the O/C ratio in the sample. See FIG. 10. As shown in FIG. 10, it may be found that reduction is uniformly performed over the entire sample in spite of rapid reduction.

The graphene composed as above exhibits very excellent electrochemical characteristics. For the experiment of electric characteristics, a lithium secondary battery was configured. The graphene (72 wt %) according to the present disclosure, polyvinylidene fluoride binder (18 wt %) and super-P (10 wt %) were mixed with N-methyl-2-pyrrolidone solvent to prepare slurry for an electrode. The slurry was uniformly applied to an Al foil and then dried at 120° C. for two 2 hours. The test battery was prepared to have a dual-electrode structure by using a Li electrode, a counter electrode, a separator (Celgard 2400) and 1 M lithium hexafluoro phosphate electrolyte in a 1:1 ethylene carbonate-dimethyl carbonate mixture. A loading density of the electrode was 1.4-1.6 g cm$^{-2}$.

By means of cyclic voltammetry (CV) measurement, it was revealed that Faraday reaction at the graphene surface caused electrochemical activity. The cyclic voltammetry (CV) was measured in a voltage range of 1.5 to 4.5 V at a scan rate of 0.1 mV s$^{-1}$. Referring to FIG. 7b, the capacitance was increased from 133.2 F g$^{-1}$ of the LFG sample to 291.6 F g$^{-1}$ of the HFG sample, which is identical to the oxidation degree of each sample. The increased capacitance was observed in a voltage range of 1.5 to 3V, which is shaded in the figure. In this voltage range, a C=O group may be reversibly oxidized or reduced with Li ion. Therefore, the graphene according to the present disclosure may be used as a cathode material of a secondary battery.

Referring to FIG. 7c, it may be found that after additional reduction thermal treatment at 400° C., the current and capacitance were reduced by factor of about 0.3. As shown in FIG. 7a and Table 1, the additional thermal treatment decreases the O/C ratio, and this means that the Faraday reaction between lithium ions and functional groups lead to great capacity of the functionalized graphene.

Referring to FIG. 7d, linearity is present between the O/C ratio and the gravimetric capacitance. This also reveals that the functionalized graphene has a great capacity by the Faraday reaction between lithium ions and functional groups.

Figure 8A:
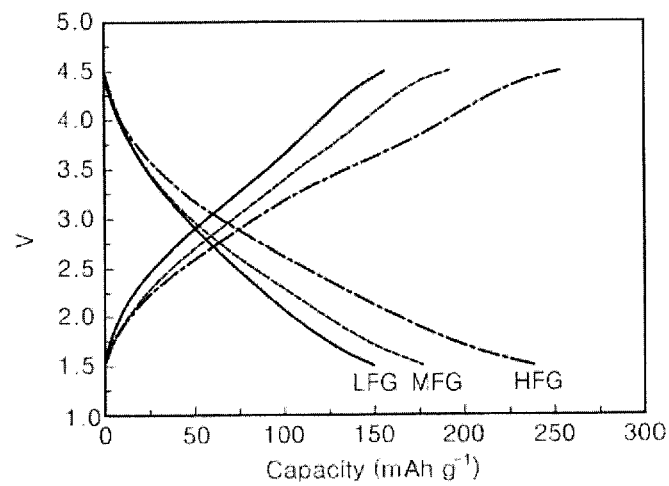
FIGS. 8a to 8e are diagrams showing electrochemical characteristics according to the degree of functionalization at the graphene manufactured according to the present disclosure, where
Figure 8B:
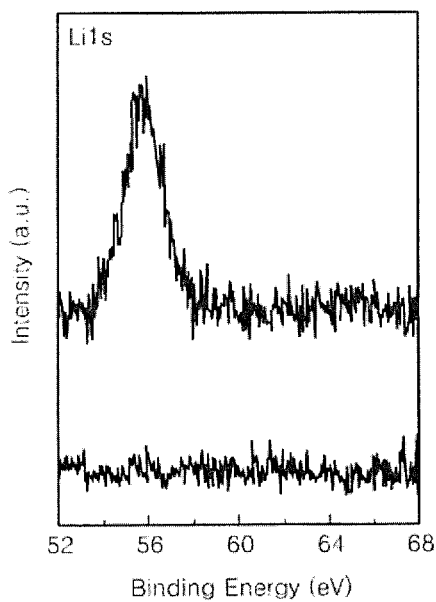
Figure 8C:
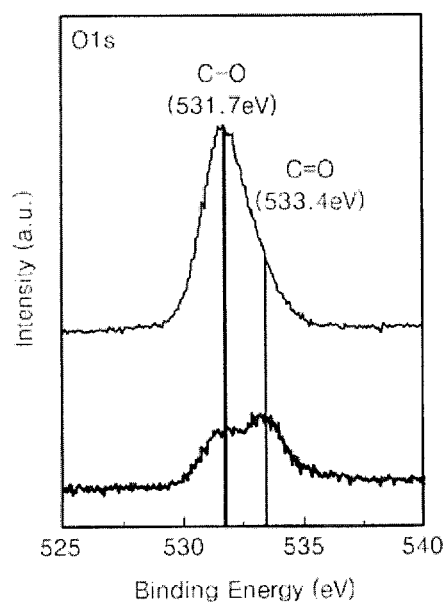
Figure 8D:
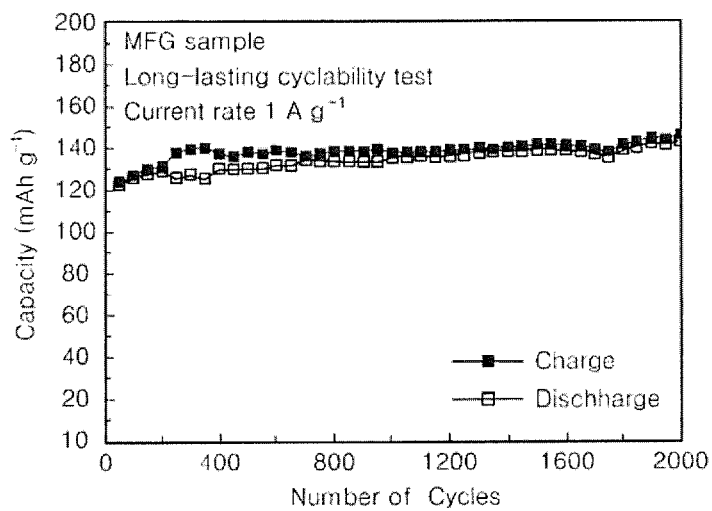
Figure 8E:
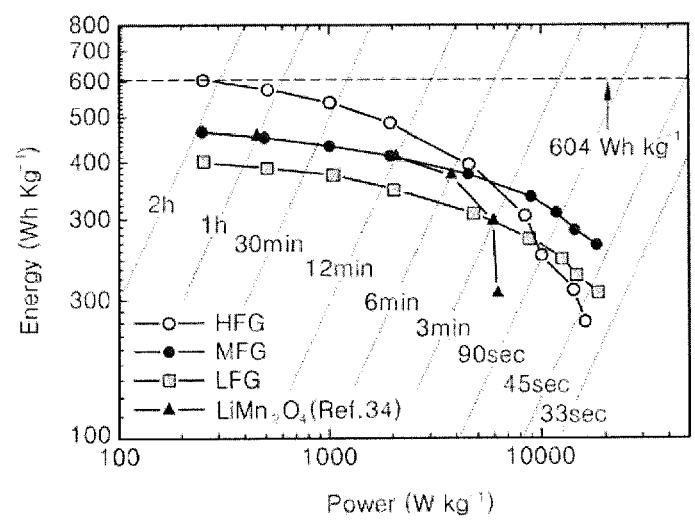

FIGS. 8a to 8e are diagrams showing electrochemical characteristics according to the degree of functionalization at the graphene manufactured according to the present disclosure, where FIG. 8a shows a charging/discharging curve of a lithium secondary battery, FIGS. 8b and 8c show ex-situ XPS results, FIG. 8d shows a cycle experiment, and FIG. 8e shows a Ragone plot.

In order to check lithium storage capacity dependency according to the functionalization degree, a potentio-galvanostat test was performed. Referring to the charging/discharging curve of FIG. 8a, it may be found that capacity increases according to the amount of functional groups. At a current density of 100 mA g$^{-1}$, HFG, MFG, and LFG respectively have capacity of 239, 178, and 150 mAh g$^{-1}$. Since charging/discharging profiles of all samples are identical to each other, it may be understood that all samples perform the same electrochemical reaction. The tendency of capacity increasing according to the amount of functional groups also supports the oxidation/reduction mechanism between functional groups and lithium. In the present disclosure, the characteristics of the graphene may be easily controlled by adjusting the amount of oxidizer and thus adjusting the amount of functional groups.

In particular, HFG, MFG, and LFG respectively carry 175, 150, and 125 g$^{-1}$ at a current rate of 2.0 A g$^{-1}$. At a current rate of 10 A g$^{-1}$, all samples also carry about 100 mAh g$^{-1}$. These high values are exhibited since the graphene according to the present disclosure is porous.

In order to reveal oxidation/reduction center of lithium storage, ex-situ XPS analysis was performed, and the analysis results are shown in FIGS. 8b and 8c. As a result of the analysis, lithium ions were stored by means of reaction with the C=O group. Referring to FIG. 8b showing a Li1s region, lithium ions were stored after discharging. Referring to FIG. 8c showing an O1s region, since an XPS peak decreases at the C=O group and the peak increases at the C—O group after discharging, it may be understood that the C=O functional group becomes a C—O group. As described above, as a single bond is formed between oxygen and carbon while breaking a double bond at the C=O group, a lithium ion is stored. When the graphene according to the present disclosure is used as a cathode material of a lithium secondary battery, it may be understood that the functional group of the graphene acts as a site for storing Li, from FIGS. 8b and 8c.

FIG. 8d shows a measurement result of capacity over 100 cycles for a stability test of an electrode, and it may be found that a MFG sample may be used with a current density of 1 A g$^{-1}$ for a long time of 2000 cycles or above without deterioration of capacity.

FIG. 8e shows a Ragone plot in which energy density and output density are depicted in one diagram. High power performance is obtained from the LFG sample, and high energy density is obtained from the HFG sample. Therefore, power and current density may be controlled by adjusting the amount of functional groups as in the present disclosure.

The power performance of the graphene increases as the oxidation degree is greater. Nevertheless, the HFG exhibits an energy of ~250 Wh kg$^{-1}$ at a power exceeding 10 kW kg$^{-1}$. The graphene according to the present disclosure has power performance comparable to a high-output LiMn$_2$O$_4$ cathode, which is commercially available. At a current rate of 6 kW kg$^{-1}$ or above, the energy of the graphene according to the present disclosure is higher than the energy of a LiMn$_2$O$_4$ nanowire. As described above, the graphene according to the present disclosure is also excellent in energy and current density in comparison to general cathode materials.

The lithium secondary battery has an energy density greater than that of another secondary battery, but it has a limit in enhancing its performance since it has been mass-produced over 20 years. In this aspect, secondary batteries using metals other than lithium have been recently studied. For example, a sodium secondary battery is a next-generation battery coming after a lithium secondary battery presently commonly used in the art, and the sodium secondary battery receives attention as an energy storage for a smart grid since its raw material is very cheap, about 1/30 to 1/40 of lithium. However, most electrode materials for a sodium battery do not overcome problems of instable charging/discharging behavior and indistinct voltage since sodium ions are greater than lithium ions.

The graphene according to the present disclosure may be used as a cathode material of a sodium secondary battery. For the test of electric characteristics, a sodium secondary battery was configured. The graphene (72 wt %) according to the present disclosure, a polyvinylidene fluoride binder (18 wt %) and super-P (10 wt %) were mixed with an N-methyl-2-pyrrolidone solvent to prepare slurry for an electrode. The slurry was uniformly applied to an Al foil and then dried at 120° C. for 2 hours. The test battery was prepared to have a dual-electrode structure by using a Na electrode, a counter electrode, a separator (grade GF/F; Whatman, USA) and an electrolyte (1M NaBF$_4$ in PC and 1M NaClO$_4$ in PC).

Figure 9A:
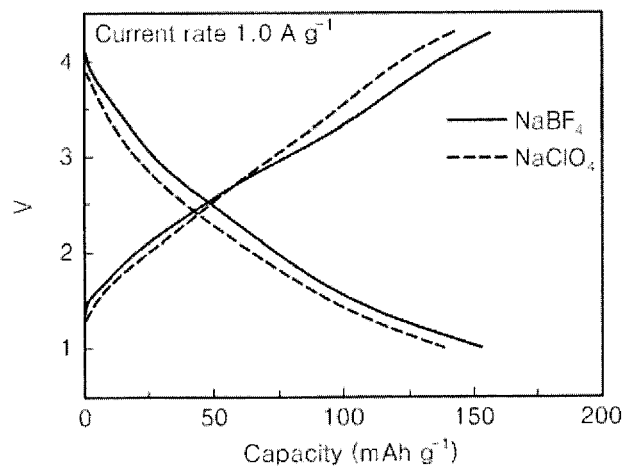
FIG. 9a is a diagram showing a charging/discharging curve of a sodium secondary battery.
Figure 9B:
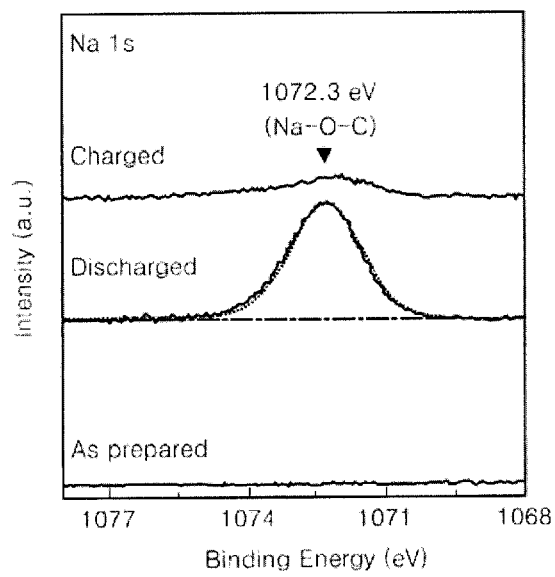
FIGS. 9b and 9c are diagrams showing ex-situ XPS results.
Figure 9C:
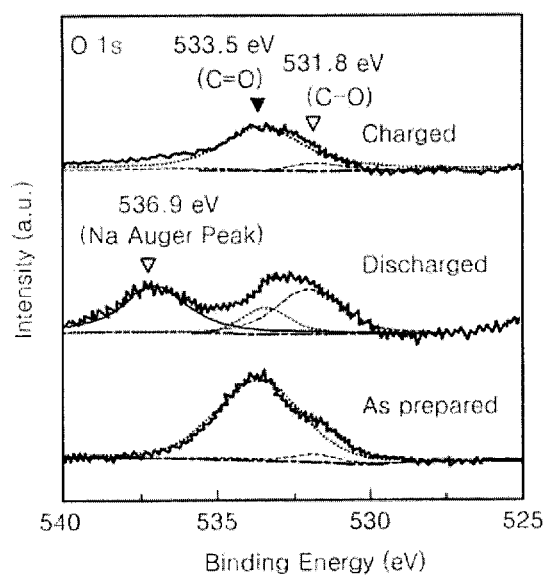

FIG. 9a is a diagram showing a charging/discharging curve of a sodium secondary battery, and FIGS. 9b and 9c are diagrams showing ex-situ XPS results.

Referring to FIG. 9a, a charging/discharging profile of each sample using a $NaBF_4$ or $NaClO_4$ electrolyte at a current density of 1 A $g^{-1}$ may be found. If the graphene according to the present disclosure is used as a cathode material, it may be found that the sodium secondary battery exhibits very stable charging/discharging behavior and distinct voltage.

In order to reveal oxidation/reduction center of sodium storage, ex-situ XPS analysis was performed, and the analysis results are shown in FIGS. 9b and 9c. As a result of the analysis, sodium ions were stored by means of reaction with the C=O group, similar to lithium ions. Referring to FIG. 9b showing a Na1s region, sodium ions were stored after discharging. Referring to FIG. 9c showing an O1s region, since an XPS peak decreases at the C=O group and the peak increases at the C—O group after discharging, it may be understood that the C=O functional group becomes a C—O group. As described above, as a single bond is formed between oxygen and carbon while breaking a double bond at the C=O group, a sodium ion is stored. When the graphene according to the present disclosure is used as a cathode material of a sodium secondary battery, it may be understood that the functional group of the graphene acts as a site for storing Na, from FIGS. 9b and 9c.

As described above, the graphene of the present disclosure may be used as a cathode material of a secondary battery using various metals since its functional group may store metal such as lithium or sodium. In addition, the graphene of the present disclosure exhibits high capacity and is advantageous for rapid charging/discharging because it has a porous structure and its pores are connected. The use of HCl is essential for forming such pores.

As described above, according to the present disclosure, graphene may be mass-produced by means of a low-temperature process in a simple and inexpensive way. An existing graphene composing method has drawbacks such as low yield and high production cost. Also, even though it has been attempted to use graphene for a lithium secondary battery, such an attempt has been limited to an anode material and focused on a hybrid structure with other nanoparticles. A cathode and an anode are very different from each other in view of electrochemical reaction mechanism and oxidation/reduction potential, and since a cathode requires storing lithium with a higher potential, it is much more difficult to develop a material suitable as a cathode material. In the present disclosure, graphene having a porous structure may be manufactured by treating a graphite oxide with a hydrochloric acid and then reducing the graphite oxide at a low thermal treatment temperature, and this graphene easily transfers lithium or sodium ions and thus is very suitable as a cathode material of a lithium or sodium secondary battery. In particular, in the present disclosure, a graphene, particularly a graphene for a cathode of a secondary battery, may be manufactured to have various characteristics by adjusting an amount of an oxidizer or reduction thermal treatment temperature to control an amount of functional groups when the graphene oxide is made.

Heretofore, preferred embodiments of the present disclosure have been described in detail, but the present disclosure is not limited to the embodiments but may be modified in various ways without departing from the scope of the present disclosure by those skilled in the art. The embodiments of the present disclosure have been considered in all illustrative and nonrestrictive aspects, and the appended claims and their equivalents and modifications fall into the scope of the present disclosure.

What is claimed is:

1. A graphene manufacturing method, comprising:
   forming a graphite oxide from graphite;
   treating the graphite oxide with a hydrochloric acid so that the hydrochloric acid remains in the graphic oxide; and
   performing thermal treatment to the hydrochloric acid-treated graphite oxide at a temperature of 120° C. to 200° C. to be reduced so that layers of the graphite oxide are separated using vapor pressure of the hydrochloric acid to form pores.

2. The graphene manufacturing method according to claim 1, wherein in the step of forming a graphite oxide, an oxidizer is used for oxidizing the graphite, and the degree of functionalization of graphene is controlled by adjusting the amount of the oxidizer.

3. The graphene manufacturing method according to claim 1, wherein the thermal treatment is performed under an air or inert gas atmosphere.

4. The graphene manufacturing method according to claim 1, wherein in addition to the thermal treatment, thermal treatment for reduction is further performed at 200° C. or above under an inert gas atmosphere.

5. The graphene manufacturing method according to claim 3, wherein the inert gas is at least one selected from the group consisting of helium (He), nitrogen ($N_2$), argon (Ar), neon (Ne) and xenon (Xe).

6. A porous graphene for a cathode of a secondary battery, which is prepared by the graphene manufacturing method according to claim 1, wherein an O/C ratio in relation to the amount of functional groups is 0.28 to 0.47.

7. The porous graphene for a cathode of a secondary battery according to claim 6, wherein the porous graphene exhibits a high voltage of 2V in comparison to lithium.

8. The porous graphene for a cathode of a secondary battery according to claim 6, wherein the porous graphene has a microstructure composed of graphene nano-plates with a thickness of 10 nm and has a pore size of several ten to several hundred nm, and the pore is formed to extend from an inside of the graphene nano-plates to a surface thereof.

9. A secondary battery, comprising:
   a cathode prepared by coating slurry for an electrode, which includes the porous graphene manufactured by the method according to claim 1, wherein an O/C ratio in relation to the amount of functional groups is 0.28 to 0.47;
   an anode containing metal;
   a separator; and
   an electrolyte containing ions of the metal.

10. The secondary battery according to claim 9, wherein the metal is lithium or sodium.

11. The graphene manufacturing method according to claim 4, wherein the inert gas is at least one selected from the group consisting of helium (He), nitrogen ($N_2$), argon (Ar), neon (Ne) and xenon (Xe).

* * * * *

UNITED STATES PATENT AND TRADEMARK OFFICE
CERTIFICATE OF CORRECTION

| | |
|---|---|
| PATENT NO. | : 9,831,501 B2 |
| APPLICATION NO. | : 14/778390 |
| DATED | : November 28, 2017 |
| INVENTOR(S) | : Kang et al. |

It is certified that error appears in the above-identified patent and that said Letters Patent is hereby corrected as shown below:

In the Specification

In Column 6, Line 39, delete "stiffing" and substitute therefor --stirring--.

Signed and Sealed this
Thirteenth Day of February, 2018

Andrei Iancu
*Director of the United States Patent and Trademark Office*